UNITED STATES PATENT OFFICE.

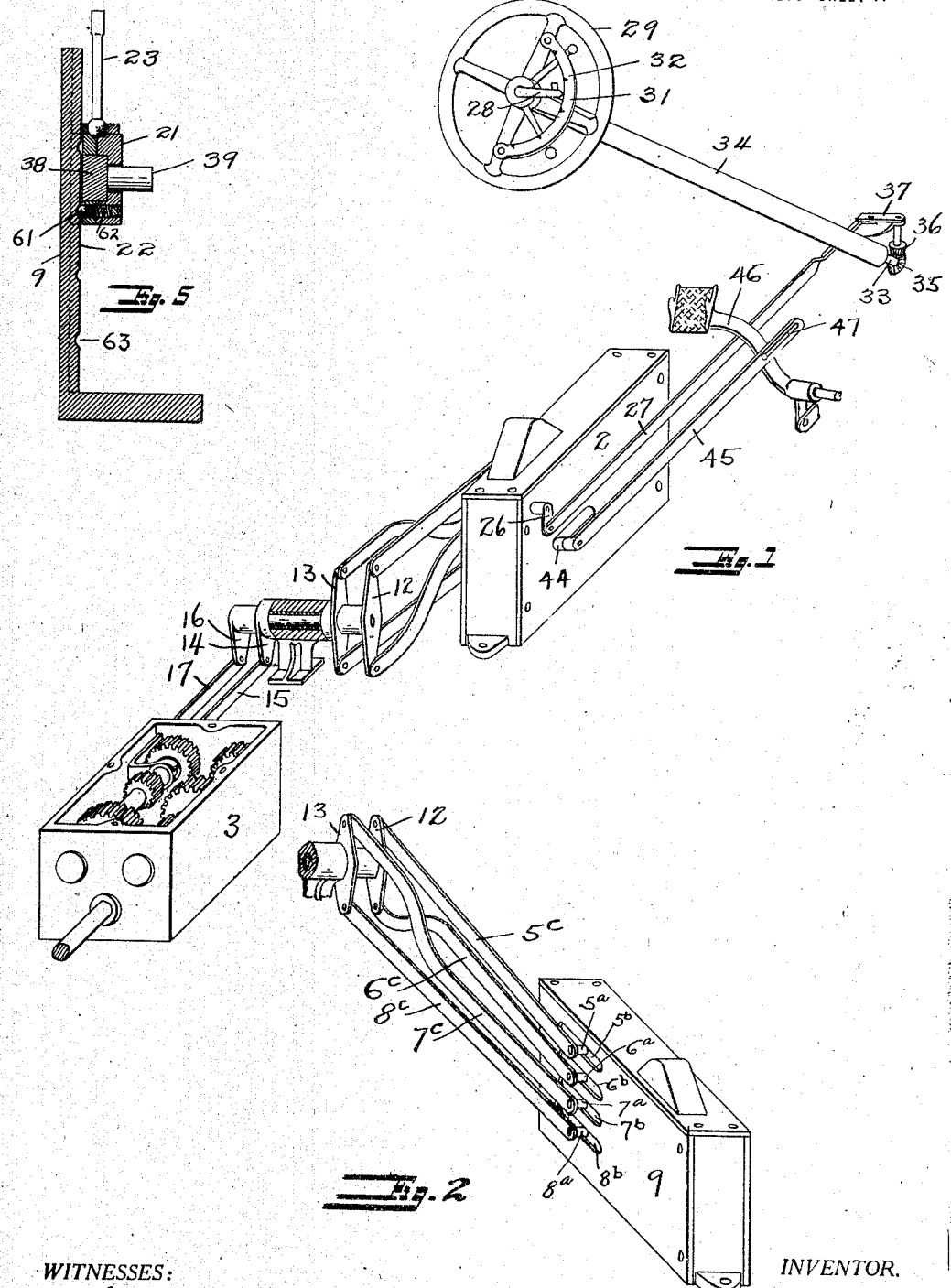

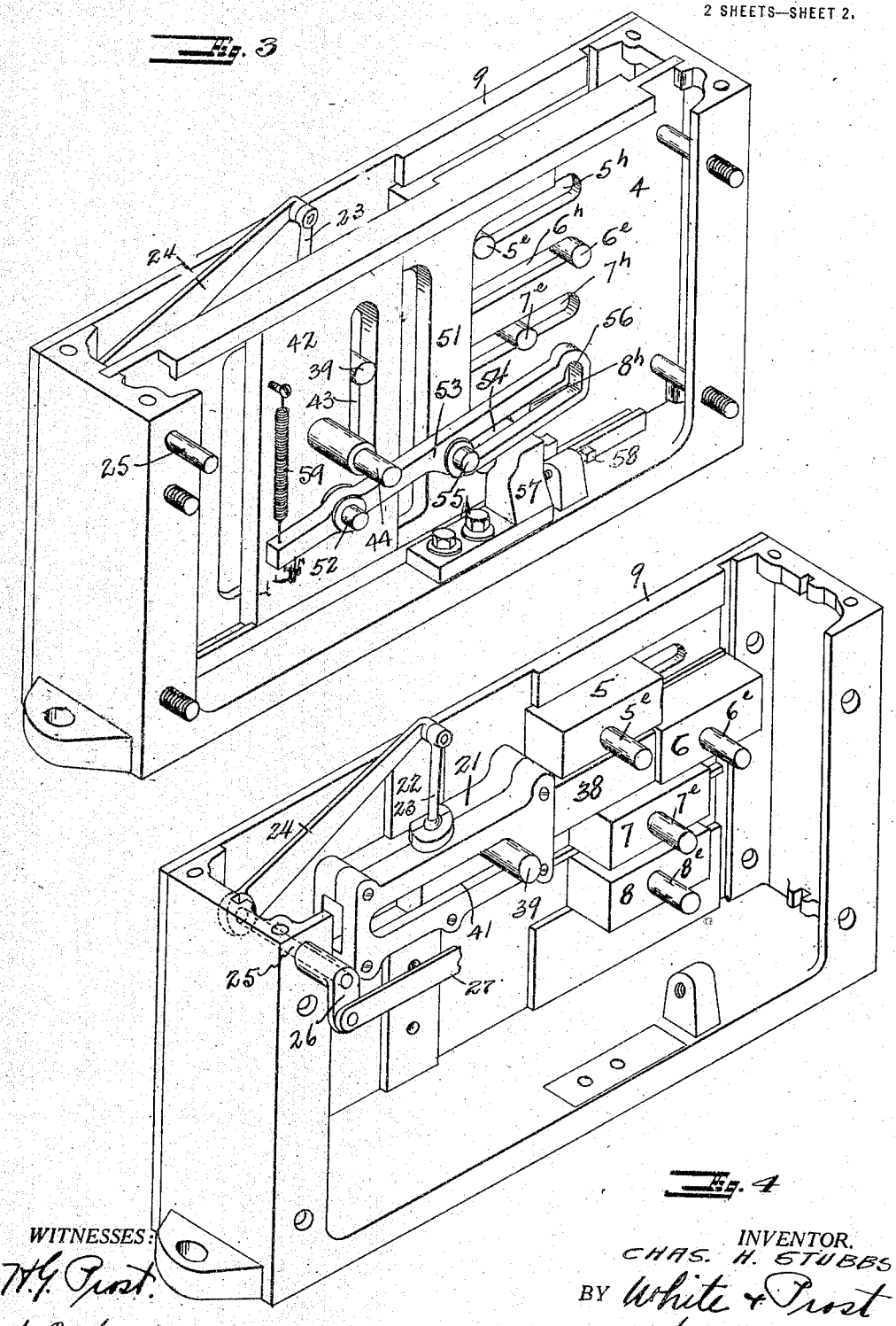

CHARLES H. STUBBS, OF BERKELEY, CALIFORNIA.

MOTOR-VEHICLE GEAR-SHIFT.

1,188,022.　　　Specification of Letters Patent.　　Patented June 20, 1916.

Application filed October 8, 1914. Serial No. 865,661.

*To all whom it may concern:*

Be it known that I, CHARLES H. STUBBS, a citizen of the United States, and a resident of Berkeley, county of Alameda, and State of California, have invented certain new and useful Improvements in Motor-Vehicle Gear-Shifts, of which the following is a specification.

The invention relates to means for selecting and shifting the transmission gears in motor driven vehicles by which the speed ratio between the engine or motor and the driven shaft is varied.

An object of the invention is to provide means for establishing a plurality of driving relations or speed ratios between the engine and the driven shaft and for mechanically selecting the desired relation or speed ratio before it is established.

Another object of the invention is to provide mechanically operated means for positively placing the gear shift mechanism in such relation, that when such mechanism is operated the desired speed ratio is obtained.

Another object of the invention is to provide means whereby the operation of the clutch pedal serves mechanically to shift the gears into such position that the previously selected speed or gear ratio is established.

Another object of the invention is to provide a small and light gear shifting device which is of comparatively small cost and which is positive in its action.

A further object of the invention is to provide means whereby the initial movement of the clutch pedal disengages the clutch, the further movement places the transmission gears in neutral position, and the continued movement places the gears in the selected position, or driving relation.

The invention possesses other advantageous features, some of which, with the foregoing, will be set forth at length in the following description, where I shall outline in full that form of the invention which I have selected for illustration in the drawings accompanying and forming part of the present specification.

In the drawings I have shown only one specific form of my generic invention, but it is to be understood that I do not limit myself to such form because my invention may be embodied in a multiplicity of forms, each being a species of my said invention. It is also to be understood that by the claims succeeding the description of my invention, I desire to cover the invention in whatever form it may be embodied within the scope of said claims.

The apparatus of my invention is particularly adapted for use in automobiles where a plurality of driving relations is essential, and although it is not limited to such use, I shall describe it herein in such connection. The transmission gears in automobiles are arranged between the clutch and the rear axle, and it is essential that the clutch be disengaged before the gears are shifted. The selection of speeds or driving relations and the shifting of the gears to obtain these relations is accomplished principally at the present time by hand, through the intervention of a gear shift lever. The present invention contemplates the elimination of the ordinary gear shift lever and the accomplishment of the shifting of the gears by the movement of the clutch pedal immediately succeeding the disengagement of the clutch which is produced by a depression of the clutch pedal. Selective means are provided for producing a certain setting of the gear shifting apparatus prior to the time of operation of the clutch pedal, so that a change in speed ratio may be anticipated and instantly made when occasion for the change arises. Since the gears may not be shifted while the clutch is engaged, many of the disastrous results now experienced by motorists are prevented and the gears are always properly moved into or out of engagement. The selective mechanism is directly and positively operated by a device arranged adjacent the steering wheel of the vehicle in convenient reach of the driver and the selection occurs simultaneously with the operation of the device. In the electric gear shift now in use, a partial circuit is established, which when completed by the depression of the clutch pedal causes the movement of the desired gears, but the actual selection is not accomplished until the clutch pedal is depressed. It has also been proposed to insert springs in the selecting mechanism, but the use of springs in such a vital part of the automobile is not advisable.

In the drawings I have shown one form of the apparatus of my invention, and in these drawings—

Figure 1 is a perspective view of the apparatus of my invention in combination with the coöperating parts of an automobile. Fig. 2 is a perspective view of the opposite side of a portion of the apparatus. Fig. 3 is a perspective view of the selecting and neutralizing device, parts thereof being removed to better disclose the interior construction. Fig. 4 is a perspective view of the same device with the neutralizing and shifting parts removed. Fig. 5 is a vertical cross section through a portion of the selecting device.

When it is desired to shift the transmission gears from one driving relation to another, the selective apparatus must be first operated, after which the actual movement of the gears is effected, and for this reason I shall first describe the selecting apparatus. The selective apparatus is preferably arranged in a casing 2, having removable side and top plates, and the casing is preferably rigidly attached to some suitable part of the vehicle, in proper relation to the transmission gear case 3. The casing 2 is preferably divided longitudinally by the vertical wall 4 and the parts of the selecting apparatus are preferably arranged at one side of the vertical wall.

The apparatus consists of a plurality of blocks or slides 5, 6, 7, 8, arranged one above the other in the casing and adapted to slide longitudinally of the casing. The number of slides is equal to the number of speed ratios which the transmission gear set is capable of producing, the usual number being four, that is, three forward speeds and one reverse speed. The slides are arranged in grooves formed in the side wall 9 and vertical wall 4 of the casing, and each slide is provided with a pin 5$^a$—6$^a$—7$^a$—8$^a$, which project respectively through slots 5$^b$—6$^b$—7$^b$—8$^b$ in the side wall 9. Pivoted to each pin is a link 5$^c$—6$^c$—7$^c$—8$^c$, which is pivoted at its opposite end to a crank which operates the proper gear shifting rod. In the present instance links 5$^c$ and 6$^c$ are connected to the opposite ends of crank 12 and links 7$^c$ and 8$^c$ are connected to the opposite ends of crank 13. Crank 13 is connected to lever 14 to which the gear shifting rod 15 is attached, and crank 12 is connected to lever 16, to which gear shifting rod 17 is attached. The arrangement of the transmission gears is such that a movement of either shifting rod 15 or 17 in either direction from its neutral or central position causes a meshing of the transmission gears. In the present instance, for the purpose of illustration, I shall assume that when the crank arms 12 and 13 are in vertical positions, the transmission gears are in neutral position, and the length of the links 5$^c$—6$^c$—7$^c$—8$^c$ is such that when the crank arms are vertical the pins 5$^a$—6$^a$—7$^a$—8$^a$ are vertically alined.

Arranged in the casing 2 in the plane of movement of the slides is a vertically movable carriage 21, which is movable transversely of the slides so that it may be moved into alinement with any of the slides. The carriage is directed in its movement by a guide 22 formed on the side wall 9. Means are provided for moving the carriage transversely of the slides and for holding it in alinement with the desired slide.

Pivotally attached to the carriage is a link 23, which is connected at its upper end to the lever 24 which is secured to the shaft 25, rotatably mounted in the casing. It is evident that rotation of the shaft 25 will produce a vertical movement of the carriage 21. Rotation of the shaft 25, to produce the desired selective position of the carriage 21, may be accomplished in many ways, one of which is shown herein. Secured to the shaft 25 is a crank arm 26, to which is attached the rod 27, which is moved by a lever 28 arranged adjacent the steering wheel 29 of the vehicle. The end of the lever lies adjacent the quadrant 31 which is provided with notches or markings 32, and when the lever is moved to one of these notches, the carriage 21 is moved into alinement with one of the slides 5, 6, 7, 8 or is moved into the neutral position. In the present instance there are five notches 32 and four slides 5, 6, 7, 8, four of the notches corresponding to the four slides and one corresponding to the neutral position. When the carriage is in the neutral position it is not alined with any of the slides, and in the present construction the neutral position of the carriage is its lowermost position. The slide 8 is spaced apart from the bottom of the casing a sufficient distance to form the neutral position at the bottom, but it is evident that the vertical spacing of the slides can be changed to place the neutral position at any desirable point.

The selecting lever 28 is secured to a rod 33, which passes down through the steering column 34 and which is connected to the rod 27 by any suitable means, such as the gears 35—36 and the lever 37. There is, therefore, a positive connection between the lever 28 and the carriage 21 and the movement of the carriage is simultaneous with the movement of the lever.

Arranged in the carriage 21 is a plunger 38, which is provided with a pin or lug 39 which extends through a longitudinal slot 41 in the carriage, and when the carriage is alined with a slide and the plunger moved, the slide, and consequently the corresponding gear shift rod 15 or 17, is moved. When the carriage is in the neutral position, the plunger is not alined with a slide, so that the movement of the plunger does not directly produce a movement of the slide, but if previous to the movement of the plunger the gears were in a driving relation, the movement of the plunger indirectly produces a movement of operative slide to its normal position.

Means are also provided for latching or holding the carriage 21 in its different operative positions, so that the jolting of the vehicle will not dislodge it from its selected position, and also that the operator may feel the carriage aline itself in proper position. Arranged in the carriage and partly projecting therefrom at one side is a latch or ball 61 which is pressed outward by the spring 62. Formed in the wall 9 or the guide 22 is a series of depressions 63, one corresponding to each operative position of the carriage. When the carriage is moved to the desired position the ball seats in the corresponding depression and holds the carriage against accidental movement.

Arranged adjacent the carriage 21 and longitudinally slidably mounted within the casing 2, and preferably on the vertical wall 4, is a plate 42 having a vertical slot 43 in which the end of the pin 39 is disposed, the slot 43 having a length equal to or greater than the vertical distance of movement of the carriage 21. The plate 4 is apertured between the carriage 21 and the plate 42 to permit the vertical and longitudinal movement of the pin 39. Secured to the plate 42 is a pin or shaft 44 which preferably extends through a longitudinal slot in the side wall of the casing 2, and to which is attached the link 45, which is connected at its forward end to the clutch pedal 46. The connection between the link 45 and the pedal is made loose through the medium of a longitudinal slot 47 in the link 45, which is engaged by a pin on the pedal, so that the pedal has a partial movement independent of the link. The initial movement of the pedal operates to disengage the clutch, and the further movement of the pedal operates to move the plunger 38.

Means are provided for first moving the engaged gears in the transmission gear set into neutral position before the gears of the desired speed ratio are moved into engagement. Secured to each slide is a pin 5ᵉ—6ᵉ—7ᵉ—8ᵉ—which projects from the opposite sides of the slides from the pins 5ᵃ—6ᵃ—7ᵃ—8ᵃ and the pins 5ᵉ—6ᵉ—7ᵉ—8ᵉ may consist of extensions of pins 5ᵃ—6ᵃ—7ᵃ—8ᵃ which extend through the slides. The pins 5ᵉ—6ᵉ—7ᵉ—8ᵉ are disposed respectively in slots 5ʰ—6ʰ—7ʰ—8ʰ formed in the central wall 4 and project beyond the face of the wall.

Arranged in the casing 2 adjacent the central wall 4 and preferably mounted thereon is a neutralizing slide 51 which lies in the plane of the projecting ends of the pins 5ᵉ—6ᵉ—7ᵉ—8ᵉ so that when the slide 51 is moved, it contacts with the pins. When these pins are vertically alined and disposed centrally in the slots 5ʰ—6ʰ—7ʰ—8ʰ, the slides 5, 6, 7, 8 are in the neutral position or in such position that the gears in the gear box are in neutral position.

Means are provided for causing the first half of the movement of the slide 42 to move the neutralizing slide 51, to cause the pins 5ᵉ—6ᵉ—7ᵉ—8ᵉ to be vertically alined in neutral position. Pivoted to the pin or shaft 52 on the slide 42 is a link 53, which is provided with a longitudinal slot 54 in which is disposed a pin 55 which is secured to the neutralizing slide 51. Formed at the end of the slot 54 is a pocket 56 in which the pin 55 engages when the slide 42 is in its normal retracted position. Arranged below the link 53 is a contact block 57 which is preferably adjustable, the set screw 58 being provided for that purpose. At the beginning of the gear shifting operation the pin 55 is seated in the pocket 56 so that the slide 51 moves forward simultaneously with the slide 42. When the slide 51 has moved a sufficient distance to place the slides 5, 6, 7, and 8 in neutral positions, the link 53 engages the contact block 57 and is tilted thereby, against the pull of the spring 59, moving the pocket 56 away from the pin 55 and bringing the pin into the groove 54. The slide 42 then continues to move forward independent of the slide 51. The latter half of the movement of the slide 42 moves the plunger 38 to the end of its throw, thereby moving either of the alined slides 5, 6, 7, or 8 out of neutral position and effecting the proper engagement of the transmission gears.

Since each pair of slides, 5—6 and 7—8 are connected to the opposite ends of the cranks 12 and 13 respectively, it is evident that as one slide of one pair is moved forward, the other is moved backward. In Fig. 4, slide 6 is moved forward and slide 5 moved backward. In its backward movement, the pin moves the neutralizing slide 51 backward to its normal position. In Fig. 3 the slide 42 is shown in its extreme advance position, having moved the pin 6ᵉ to one end of its slot and consequently caused the pin 5ᵉ to be moved to the opposite end of its slot, and in so moving, the pin 5ᵉ has moved the neutralizing slide 51 backward to its normal position.

Since the movement of each slide 5—6—7—8 in the proper direction establishes a specific driving relation, I shall assume that the movement of slide 5 to the right of the central or neutral position places the gears in the "high gear" relation, a movement of slide 6 to the right places the gears in the "intermediate gear" relation, a movement of slide 7 to the right places the gears in the "low gear" relation and a movement of slide 8 to the right places the gears in the "reverse gear" relation. In Figs. 3 and 4, the position of the slides is such as to produce the "intermediate" driving relation.

When it is desired to place the transmission gears in neutral position, the carriage 21 is moved to its neutral position at the bottom of the casing 2, in which position the plunger 38 will not engage any slide 5—6—7—8. Those slides of the slides 5—6—7—8 which are not in neutral position are then moved to neutral position by the movement of the neutralizing slide 51.

The operation of the apparatus is as follows: Assuming that the slides 5, 6, 7, 8 are in neutral or centrally alined position, and it is desired to move the transmission gears into mesh, the lever 28 is set at the proper notch 38, and this moves the carriage 21 vertically into alinement with the corresponding slide, for instance slide 6. When it is desired to shift the gears, the clutch pedal 46 is fully depressed and the proper gears are then enmeshed. The initial movement of the clutch pedal releases the clutch, and the continued movement produces the shifting of the gears, and the release of the pedal again engages the clutch. It is then desired to shift to a different speed. The lever 28 is set at the proper notch and the clutch pedal fully depressed. The initial movement of the pedal releases the clutch, the next portion of the movement causes the slides and consequently the gears to be moved to neutral position, and the continued further movement of the pedal causes the proper gears to be enmeshed in the selected driving relation. The clutch pedal is then released.

I claim—

1. A gear shifting apparatus comprising gearing for establishing a plurality of driving relations and means for shifting said gears to establish any of said relations, said means comprising a plurality of slides connected to said gears, a carriage movable into alinement with any of said slides and a plunger carried by the carriage moving the alined slide.

2. A gear shifting apparatus comprising gearing for establishing a plurality of driving relations and means for shifting said gears to establish any of said relations, said means comprising a plurality of slides connected to said gears, a carriage arranged adjacent said slides, means for moving the carriage into alinement with any one of said slides and means slidably supported on the carriage adapted to engage and move the alined slide.

3. A gear shifting apparatus comprising gearing for establishing a plurality of driving relations and means for shifting said gears to establish any of said relations, said means comprising a plurality of slides connected to said gears, a carriage movable into alinement with any one of said slides, means for moving said carriage, a plunger in said carriage and means for moving the plunger longitudinally independently of the carriage.

4. A gear shifting apparatus comprising gearing for establishing a plurality of driving relations and means for shifting said gears to establish any of said relations, said means comprising a plurality of slides connected to said gears, a carriage movable across the ends of said slides, a plunger carried by said carriage adapted to be moved longitudinally, a longitudinally movable slide adjacent said plunger and connected thereto and means for moving said slide longitudinally.

5. A gear shifting apparatus comprising gearing for establishing a plurality of driving relations, shifting rods connected to said gearing, slides connected to said shifting rods, a carriage movable across the ends of said slides, a plunger carried by said carriage adapted to be moved longitudinally and thereby move the corresponding slide, a pin on said plunger, a longitudinally movable slide arranged adjacent said carriage provided with a slot in which said pin engages and means for moving said longitudinally movable slide.

6. A gear shifting apparatus comprising gearing for establishing a plurality of driving relations, shifting rods connected to said gearing, slides connected to said shifting rods, a carriage movable transversely of said slides, a plunger carried by the carriage adapted to be moved longitudinally independently of the carriage and thereby move the corresponding slide and means operated by the initial movement of the plunger for moving the gears into neutral position and by the further movement of the plunger in the same direction for moving the gears into driving relation.

7. A gear shifting apparatus comprising gearing for establishing a plurality of driving relations, shifting rods connected to said gearing, slides connected to said shifting rods, a carriage movable transversely of said slides, a plunger carried by the carriage adapted to be moved transversely and thereby move the corresponding slide, a longitudinally movable slide arranged adjacent to and connected to said plunger and a neutralizing slide connected to said longitudinally movable slide.

8. A gear shifting apparatus comprising gearing for establishing a plurality of driving relations, a shifting rod connected to said gearing, slides connected to said shifting rod, a carriage movable transversely of said slides, means longitudinally slidable in the carriage for individually moving said slides and means for holding the carriage in alinement with any of said slides.

9. A gear shifting apparatus comprising gearing for establishing a plurality of driving relations, a plurality of slides connected to said gearing, a longitudinally movable plunger adapted to be moved into alinement with any of said slides and means actuating the plunger for moving the operative slides into neutral position.

10. A gear shifting apparatus comprising gearing for establishing a plurality of driving relations, a plurality of slides connected to said gearing, a carriage movable transversely across the ends of said slides, a plunger in said carriage adapted to be moved into alinement with any of said slides, means for moving said plunger longitudinally, a neutralizing slide connected to said plunger and means for disengaging the plunger and neutralizing slide when the slides have been moved to neutral position.

11. A gear shifting apparatus comprising gearing for establishing a plurality of driving relations, a plurality of slides connected to said gearing, a longitudinal movement of any slide serving to establish a certain driving relation, and means operative to move said slides into neutral position and by its further continued movement in the same direction to move one of said slides into operative position.

12. A gear shifting apparatus comprising gearing for establishing a plurality of driving relations, a plurality of slides connected to said gearing, a longitudinal movement of any slide serving to establish a certain driving relation, a carriage movable transversely across the ends of said slides, a plunger carried by said carriage, a slide plate connected to said plunger, a neutralizing slide connected to said slide plate, means for disconnecting said neutralizing slide from said slide plate when the slides reach their neutral position and means for moving said slide plate longitudinally to effect the movement of said plunger and neutralizing slide.

13. In a motor vehicle, an engine, a driven shaft, gearing between the engine and the driven shaft for establishing a plurality of driving relations, a clutch between said engine and gearing, a foot lever for operating said clutch, mechanically operated means for positively selecting the desired driving relation during the engagement of said clutch and means operative by the movement of the foot lever for establishing the desired driving relation.

14. In a motor vehicle, an engine, a driven shaft, gearing between the engine and the driven shaft for establishing a plurality of driving relations, a clutch between said engine and gearing, mechanically operated means for positively selecting the desired driving relation during the engagement of said clutch and means connected to the foot lever for first moving said gears into neutral position and then establishing the selected driving relation.

15. In a motor vehicle, an engine, a driven shaft, gearing between the engine and the driven shaft for establishing a plurality of driving relations, a clutch between the engine and gearing, a foot lever for operating said clutch, mechanically operated means for positively selecting the desired driving relation and means loosely connected to said foot lever and operative by the complete depression of said lever for establishing the selected driving relation.

16. In a motor vehicle, an engine, a driven shaft, gearing between the engine and the driven shaft for establishing a plurality of driving relations, a clutch between said engine and gearing, a foot lever operative by its initial movement to disengage said clutch, mechanically operated means for positively selecting the desired driving relation while the clutch is engaged and means loosely connected to said foot lever operative by the movement of the foot lever after the clutch is disengaged to move the gears first into neutral position and then establish the previously selected driving relation.

17. A gear shifting apparatus comprising gearing for establishing a plurality of driving relations and means for shifting said gears to establish any of said relations, said means comprising a plurality of slides connected to said gears, a carriage movable across the ends of said slides, a plunger carried by said carriage adapted to be moved longitudinally, a longitudinally movable plate adjacent said plunger and connected thereto, and a neutralizing slide mediately connected to said plate.

18. A gear shifting apparatus comprising gearing for establishing a plurality of driving relations and means for shifting said gears to establish any of said relations, said means comprising a plurality of slides connected to said gears, a carriage movable across the ends of said slides, a plunger carried by said carriage adapted to be moved longitudinally, a longitudinally movable plate adjacent said plunger and connected thereto, a neutralizing slide mediately connected to said plate, and means for disengaging said mediate connections when the slides have been moved to neutral position.

19. A gear shifting apparatus comprising gearing for establishing a plurality of driving relations, shifting rods connected to said gearing, slides connected to said shifting rods, a member adapted to be moved into alinement with any of said slides and movable to operate the alined slide, a longitudinally movable plate connected with and operative to move said member, a neutralizing slide adjacent said plate, and a pivoted link connecting said neutralizing slide and plate.

20. A gear shifting apparatus comprising gearing for establishing a plurality of driving relations, shifting rods connected to said gearing, slides connected to said shifting rods, a member adapted to be moved into alinement with any of said slides and movable to operate the alined slide, a longitudinally movable plate connected with and operative to move said member, a neutralizing slide adjacent said plate, a link connecting said neutralizing slide and plate, and means for disconnecting said link when the gears have been moved to neutral position.

21. A gear shifting apparatus comprising gearing for establishing a plurality of driving relations, shifting rods connected to said gearing, slides connected to said shifting rods, a member adapted to be moved into alinement with any of said slides and movable to operate the alined slide, a longitudinally movable plate connected with and operative to move said member, a neutralizing slide adjacent said plate, a link connecting said neutralizing slide and plate and means for moving said plate.

In testimony whereof, I have hereunto set my hand at San Francisco, California, this 3rd day of October, 1914.

CHARLES H. STUBBS.

In presence of—
  H. G. PROST,
  M. LE CONTE.